Mar. 6, 1923.
E. E. THOMAS.
NUT LOCK.
FILED MAY 2, 1921.
1,447,578.
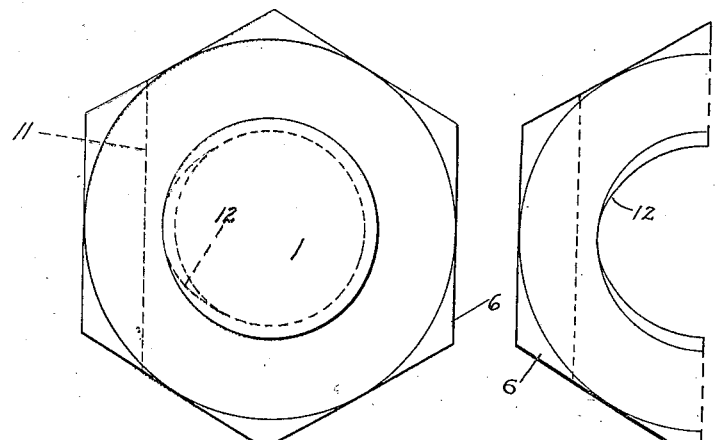
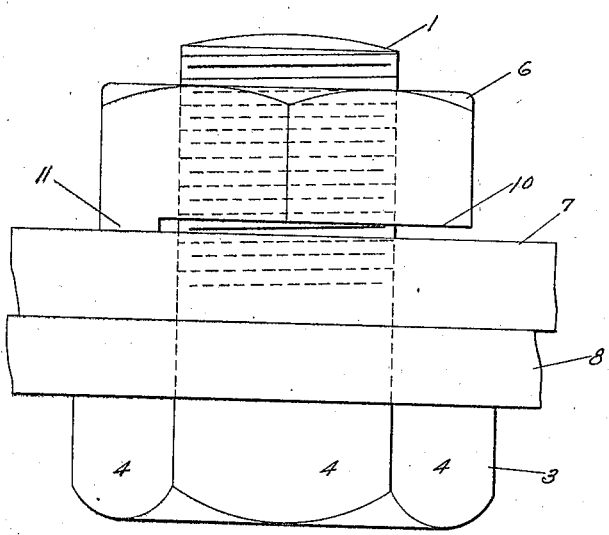
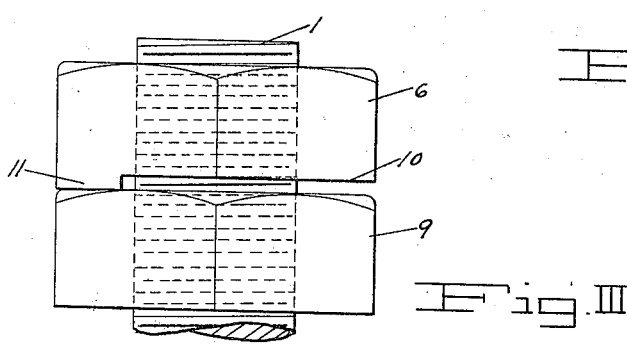
Inventor
Edwin E. Thomas,
By Atkins & Atkins
Attorneys Patented Mar. 6, 1923.

1,447,578

UNITED STATES PATENT OFFICE.

EDWIN E. THOMAS, OF PORTLAND, OREGON, ASSIGNOR TO WILLIAM I. CHIDESTER, OF PORTLAND, OREGON.

NUT LOCK.

Application filed May 2, 1921. Serial No. 466,056.

*To all whom it may concern:*

Be it known that I, EDWIN E. THOMAS, a citizen of the United States of America, and resident of Portland, in the county of Multnomah, in the State of Oregon, have invented certain new and useful Improvements in Nut Locks, of which the following is a specification, reference being had to the accompanying drawing.

My invention relates to lock-nuts, and its object is to produce a nut having at once extreme simplicity and locking efficiency, that may be applied to any bolt of any ordinary size and thread corresponding to the bore and thread of the bolt.

My invention also comprehends tap bolts that are directly applicable against a plate provided with a threaded aperture. In the case last indicated, the head of the tap bolt functionates similarly to my nut to effect security of union between the bolt and the plate that is apertured and threaded for its reception.

What constitutes my present invention will be hereinafter described in detail and succinctly set forth in the appended claim.

In the accompanying drawing,

Figure I is a side elevation of one of my nuts applied to a bolt shown as penetrating and securing together a pair of plates.

Figure II is an end view of the nut and bolt as shown in Figure I, but detached.

Figure III is a side elevation of a section of a threaded bolt or rod, and of two nuts thereon, the topmost being a nut of my present invention.

Fig. IV is a half-sectional view of the nut, showing the recess therein.

Referring to the numerals on the drawing, 1 indicates a cylindrical threaded member which, if it constitute part of a bolt, as shown in Figure I, is provided with a head 3 that preferably comprises flatted sides 4 usually provided for the accommodation of a smooth-jawed wrench, such, for instance, as a monkey-wrench.

To the member 1, is threaded my lock-nut 6, which may be set directly against a plate 7, constituting, for instance, one of a plurality of plates, 7 and 8, united by a bolt that includes the member 1, or which may be set, with locking effect, directly against an ordinary nut 9, as shown in Figure III.

The nut 6 preferably has flatted sides like the head 3 of the bolt.

The lock-nut 6 is differentiated in point of novelty and utility by having its bearing face 10 provided, on one side of the bore of the nut, preferably adjacent to the outer periphery thereof, with a fulcrum piece 11, that projects beyond the face 10 a sufficient distance to accommodate it to the performance of its function, hereinafter described, and is preferably made integral with the nut. The fulcrum piece 11 might be accommodated upon the face of the nut 9 or even upon the plate 7, but the reasons for its being preferential to make it a part of the lock-nut are obvious.

The provision of a fulcrum piece 11 is believed to be, of itself, novel, and will, without further provision, functionate to a certain degree to lock the nut 6 to the member 1; but I prefer, besides the said fulcrum piece, to provide the nut 6, within and coaxially with the bore of the nut 6, on the side thereof adjacent to the said fulcrum piece, with a recess 12. The said recess mutilates or cuts away the threads of the nut within the bore thereof sufficiently to permit a slight tilting movement of the nut, with a consequent deflection of its axis from the axis of the member 1.

The said tilting movement of the nut is effected always by any screw action that will force the nut against the laterally disposed fulcrum piece 11. Such tilting movement will cause the diametrically opposite portion of the engaging threads of the nut and of the member 1 which covers it, to bind, one upon the other, with correlative locking effect upon the nut and member 1. Such locking effect will result, even without provision of the recess 12, but by its provision the locking effect is increased, for the reason that the presence of the recess permits a greater degree of tilting movement of the nut, and restricts the binding action between the threads of the nut 6 and member 1, respectively, to that portion of those threads which are located opposite the fulcrum piece 11, in a direction diametrical to the bore of the nut.

The operation of my invention will, it is believed, be apparent from the foregoing specification without further description.

What I claim is:

A lock nut having, upon one side of its bearing face, a fulcrum piece, in combination with a recess, effecting a mutilation of its threads, defined co-axially within the bore of the nut on the side thereof adjacent to the fulcrum piece.

In testimony whereof, I have hereunto set my hand in the presence of two subscribing witnesses.

EDWIN E. THOMAS.

Witnesses:
 LEICESTER B. ATKINS,
 SARAH Z. RILEA.